UNITED STATES PATENT OFFICE.

MICHAEL ILJINSKY, OF UERDINGEN-ON-THE-RHINE, AND REINHOLD TSCHUNKE, OF BRESLAU, GERMANY, ASSIGNORS TO MESSRS. R. WEDEKIND & CO., M. B. H., OF UERDINGEN-ON-THE-RHINE, GERMANY.

YELLOW VAT DYESTUFFS.

1,087,293.     Specification of Letters Patent.     Patented Feb. 17, 1914.

No Drawing.     Application filed February 8, 1913. Serial No. 747,148.

*To all whom it may concern:*

Be it known that we, MICHAEL ILJINSKY, a subject of the Russian Emperor, and Dr. REINHOLD TSCHUNKE, a subject of the German Emperor, residing, respectively, at Uerdingen-on-the-Rhine and at Breslau, Germany, have invented new and useful Yellow Vat Dyestuffs; and we do hereby declare the following to be a full, clear, and exact description of the same.

By heating 1-chlor-2-oxyanthraquinone, dichlor-2-oxyanthraquinone and dibrom-2-oxyanthraquinone at from 220 to 280° C., with or without the addition of soda, of caustic alkali or of salts with an alkaline reaction, as *e. g.* borax, or with the addition of salts, the acid radical of which is easily liberated by hydrochloric acid, as *e. g.* sodium sulfite, condensation takes place in the manner, that two molecules of the halogen-anthraquinone combine with each other, while halogen-hydrogen is expelled. In starting from 1-chlor-2-oxyanthraquinone, a product of condensation, practically free from chlorin results. In the case of di-halogen-2-oxyanthraquinone, products of condensation containing halogen are obtained. All these compounds are, either without any further treatment or after being purified, valuable yellow vat dyestuffs, they can also be used as raw materials for the manufacture of other useful dyestuffs. The purification is best done by leaching the crude melt with diluted alkali and energetically treating the powdered product with chlorin.

The reaction apparently takes place according to the following equation:

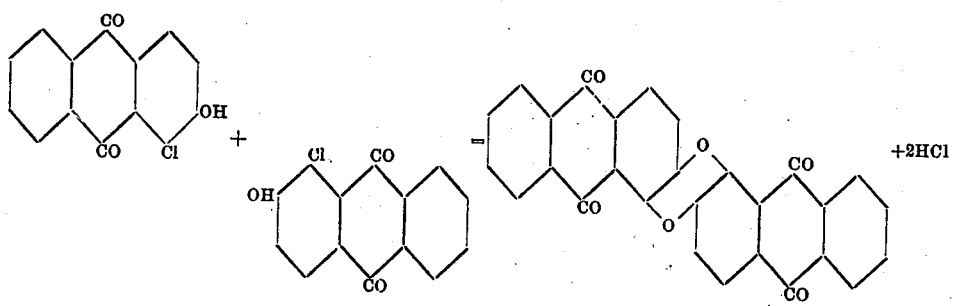

From the analytical data obtained, it appears that the dyestuff made from 1-chlor-2-oxyanthraquinone has the formula

while the products made from dichlor-2-oxyanthraquinone and from dibrom-2-oxyanthraquinone have the formulæ

and

respectively.

*Example 1—Dye-stuff made from 1-chlor-2-oxyanthraquinone.*—50 ko. 1-chlor-2-oxyanthraquinone are heated in an iron vessel, equipped with a stirrer, to 220° C. To the liquid melt 10 to 13 ko. of calcined soda are gradually added. After the mass has ceased to foam, the temperature is raised to about 275° C., whereby the melt gets gradually thicker, until it is finally quite tough. After cooling, the product is ground with water to a paste, filtered and leached with diluted alkali. The brownish-yellow paste is reduced with alkaline hydrosulfite to a brownish-red vat which dyes cotton brownish-yellow. The dyeings are changed by acid into yellow. By washing and soaping or by treating with alkali the original brownish-yellow color is restored. Only by an energetical chlorination of the dyeings the color becomes a pure yellow and fast to alkali. Instead of this treatment on the fiber, the dyestuff is advantageously as such acted upon with chlorin, with or without the addition of nitric acid, until its color is purely yellow and does not change any more into brownish-yellow upon the addition of alkali. For this purpose, the brownish-yellow crude product is best dissolved in concentrated sulfuric acid and the solution poured into water, whereby the dyestuff is precipitated in a very finely divided form. The precipitate, after filtering and washing is treated with chlorin in the presence of either an acid or an alkali. The substance thus purified gives with caustic soda and hydrosulfite a brownish-red clear vat which dyes cotton in very pure yellow tints of excellent properties as to fastness. In organic solvents the compound is not readily soluble, it can however be crystallized out of hot glacial acetic acid or nitrobenzene. Its solution in concentrated sulfuric acid is yellowish-red.

*Example 2—Dyestuff made from dichlor-2-oxyanthraquinone.*—50 ko. dichlor-2-oxyanthraquinone are ground together with 10 ko. of calcined soda and heated in an iron vessel, equipped with a stirrer. At about 220° C. the mixture melts, at higher temperatures it becomes tough, and at about 250° C. it liquefies again. After stirring for about 3 hours at 250° C. the mass gets tough again. After cooling, the crude melt is treated exactly as described under Example 1. The leached product is somewhat more yellow than the compound made from 1-chlor-2-oxyanthraquinone. It also differs from this product in the respect, that its alkaline vat dyes cotton in much deeper brownish-yellow tints of good fastness. By treating the crude melt with chlorin, the dyeings gain somewhat in purity, the brownish-yellow color does however not change into a pure yellow. The compound which contains chlorin, is more readily soluble in organic solvents than the product of Example 1. It can easily be crystallized out of glacial acetic acid and nitrobenzene. Its solution in concentrated sulfuric acid is yellowish-red.

*Example 3—Dyestuff made from dibrom-2-oxyanthaquinone.*—50 ko. dibrom-2-oxyanthraquinone are intimately mixed with 14 ko. of calcined soda, and the mixture is heated to from 250 to 260° C. After the reaction has ceased, the temperature of the mass is kept at 250° C. for from 1 to 2 hours, until a sample does not any longer give an alkaline reaction. The powdered melt is extracted with diluted alkali, the residue is then dissolved in concentrated sulfuric acid and precipitated with water. The filtered and washed precipitate is purified by treating it with either chlorin or bromin. The purified substance behaves toward organic solvents and concentrated sulfuric acid like the analogous yellow dyestuff made from 1-chlor-2-oxyanthraquinone, from which it differs only by its contents of bromin. Its alkaline, vat dyes cotton in quite similar greenish-yellow tints. The properties of the dyeings as to fastness are excellent. It represents a yellow powder soluble in concentrated sulfuric acid with yellowish red color and not readily soluble in hot glacial acetic acid and in nitrobenzene, its brownish vat, made with hydrosulfite and caustic alkali, dyeing with a fast color.

We claim:

1. As a new product a dye of the anthraquinone series having the nucleus:

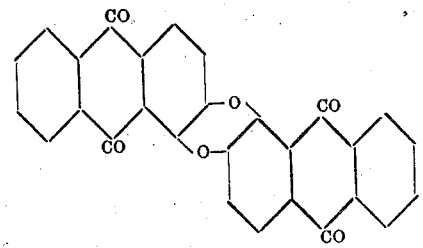

2. As a new product a dye of the anthraquinone series having the nucleus:—

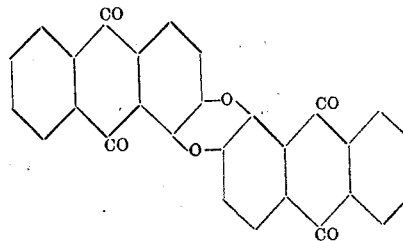

and which after drying and grinding, represents a yellow powder, soluble in concentrated sulfuric acid with yellowish-red color and not readily soluble in hot glacial acetic acid and in nitrobenzene, its brownish vat, made with hydrosulfite and caustic alkali, dyeing with a fast yellow color.

3. As a new product, a dye of the anthraquinone series consisting of halogen-dianthraquinonylendioxid.

4. As a new product, a dye of the anthraquinone series consisting of dibrom-dianthraquinonylendioxid.

In testimony whereof, we have signed our names to this specification in the presence of two subscribing witnesses.

MICHAEL ILJINSKY.
Dr. REINHOLD TSCHUNKE.

Witnesses as to Michael Iljinsky:
  NANNY SCHNEIDER,
  HENRY QUADFLIEG.
Witnesses as to Dr. Reinhold Tschunke:
  ERNST KOTZ,
  ERNST BERTSCH.